(12) United States Patent
Cook et al.

(10) Patent No.: US 9,796,488 B2
(45) Date of Patent: Oct. 24, 2017

(54) DUAL PORT PAYLOAD ATTACH RING COMPATIBLE SATELLITE

(71) Applicant: THE BOEING COMPANY, Chicago, IL (US)

(72) Inventors: Timothy Scott Cook, Chicago, IL (US); Robert Bruce Friend, Chicago, IL (US)

(73) Assignee: The Boeing Company, Chicago, IL (US)

( * ) Notice: Subject to any disclaimer, the term of this patent is extended or adjusted under 35 U.S.C. 154(b) by 264 days.

(21) Appl. No.: 14/873,990

(22) Filed: Oct. 2, 2015

(65) Prior Publication Data
US 2017/0096240 A1   Apr. 6, 2017

(51) Int. Cl.
B64G 1/64   (2006.01)

(52) U.S. Cl.
CPC .............. B64G 1/641 (2013.01); B64G 1/64 (2013.01); B64G 1/645 (2013.01); B64G 1/646 (2013.01); B64G 2001/643 (2013.01)

(58) Field of Classification Search
CPC .......... B64G 1/641; B64G 1/64; B64G 1/646; B64G 1/645; B64G 2001/643
See application file for complete search history.

(56) References Cited

U.S. PATENT DOCUMENTS

| | | | |
|---|---|---|---|
| 5,125,601 A | * | 6/1992 | Monford, Jr. .......... B64G 1/641 244/173.1 |
| 5,429,328 A | * | 7/1995 | Dobbs ................... B64G 1/646 244/172.5 |
| 5,884,866 A | * | 3/1999 | Steinmeyer ............ B64G 1/002 244/137.1 |

(Continued)

FOREIGN PATENT DOCUMENTS

| GB | 2396595 A | 6/2004 |
|---|---|---|
| WO | 01/89927 A1 | 11/2001 |

OTHER PUBLICATIONS

Maly, Joseph R. et al., Adapter Ring for Small Satellites on Responsive Launch Vehicles, Proceedings of the AIAA/7th Responsive Space Conference, AIAA-RS7-2009-1006. Washington: AIAA, 2009:1-9 American Institute of Aeronautics & Astronautics 7th Responsive Space Conference, Los Angeles, CA, Apr. 27-30, 2009 (Apr. 1, 2009), p. 9pp, XP009191171.

(Continued)

*Primary Examiner* — Philip J Bonzell
*Assistant Examiner* — Michael Kreiner
(74) *Attorney, Agent, or Firm* — Haynes and Boone, LLP

(57) ABSTRACT

Systems, methods, and apparatus for dual port ring compatible satellites are disclosed. In one or more embodiments, a method for removably attaching at least one spacecraft to a payload attach ring on a launch vehicle involves attaching a strongback of each of the spacecrafts to two respective payload ports of the payload attach ring on the launch vehicle. In one or more embodiments, the strongback of each of the spacecrafts is attached to each of the two respective payload ports via a respective beam mounted to a respective port adaptor plate. The method further involves separating the strongback of each of the spacecrafts from the two respective payload ports of the payload attach ring on the launch vehicle by using at least one mechanical actuator on each of the beams.

18 Claims, 11 Drawing Sheets

(56) References Cited

U.S. PATENT DOCUMENTS

| | | | | |
|---|---|---|---|---|
| 6,276,639 | B1* | 8/2001 | Hornung | B64G 1/002 |
| | | | | 102/489 |
| 6,330,093 | B1* | 12/2001 | Eller | B64G 1/10 |
| | | | | 398/164 |
| 6,416,018 | B2* | 7/2002 | DiVerde | B64G 1/002 |
| | | | | 244/137.1 |
| 6,547,476 | B2* | 4/2003 | Kaszubowski | B64G 1/641 |
| | | | | 244/158.1 |
| 7,036,773 | B2* | 5/2006 | Caldwell | B64G 1/002 |
| | | | | 244/137.4 |
| 8,393,582 | B1* | 3/2013 | Kutter | B64G 1/002 |
| | | | | 244/172.2 |
| 8,550,408 | B2* | 10/2013 | Ross | B64G 1/641 |
| | | | | 244/159.4 |
| 8,678,323 | B2* | 3/2014 | Barber | B64G 1/641 |
| | | | | 244/173.1 |
| 8,789,797 | B2* | 7/2014 | Darooka | B64G 1/10 |
| | | | | 244/159.4 |
| 8,939,409 | B2* | 1/2015 | Apland | B64G 1/641 |
| | | | | 244/173.1 |
| 9,231,323 | B1* | 1/2016 | Jaeger | F16L 37/002 |
| 9,475,594 | B2* | 10/2016 | Barber | B64G 1/641 |
| 2012/0012711 | A1 | 1/2012 | Ross et al. | |
| 2015/0344157 | A1* | 12/2015 | Horie | B64G 1/641 |
| | | | | 225/96 |

OTHER PUBLICATIONS

The extended European search report in European Patent Application No. 16191822.2-1754 (9pp).

ESPA: The EELV Secondary Payload Adaptor, MOOG CSA Engineering, available at: http://www.csaengineering.com/products-services/espa, 2010.

ESPA Borchure, MOOG CSA Engineering, available at: http://www.csaengineering.com/literature/Space_Defense/Vibration_Control/MoogCSA_ESPA0710.pdf, 2010.

Mark II Motorized Lightband, Planetary Systems Corporation, available at: http://planetarysystemscorp.com/?post_type=product?p=449, 2011.

* cited by examiner

DUAL PORT PAYLOAD ATTACH RING COMPATIBLE SATELLITE

FIELD

The present disclosure relates to payload attach ring compatible satellites. In particular, it relates to dual port payload attach ring compatible satellites.

BACKGROUND

Launch vehicles often employ a payload attach ring to attach multiple satellites to enable a shared launch for multiple satellites. Currently, conventional payload attach ring designs have a very limited ability to support relatively large satellites for launch. Larger payload attach ring designs have been proposed to support larger satellites. However, the allowable maximum height of the payload attach ring is dependent upon the size of the launch fairing of the launch vehicle. As such, taller payload attach rings may not be possible for all launches. Thus, there is need for payload attach ring solutions that can accommodate relatively large satellites.

SUMMARY

The present disclosure relates to a method, system, and apparatus for dual port payload attach ring compatible satellites. In one or more embodiments, a method for removably attaching at least one spacecraft to a payload attach ring on a launch vehicle involves attaching a strongback of each of the spacecrafts to two respective payload ports of the payload attach ring on the launch vehicle.

In one or more embodiments, the strongback of each of the spacecrafts is attached to each of the two respective payload ports via a respective beam mounted to a respective port adaptor plate. In at least one embodiment, the strongback of each of the spacecrafts is attached to each of the beams via at least one coupler held in place by at least one mechanical actuator. In some embodiments, at least one coupler is a cup/cone interface or a similar load bearing interface.

In at least one embodiment, each of the beams is mounted to each of the respective port adaptor plates via at least one bolt. In some embodiments, each of the port adaptor plates is mounted to one of the respective payload ports via at least one bolt.

In one or more embodiments, each of the beams comprises at least one spring, and when the strongback of each of the spacecrafts is attached to each of the two respective payload ports, the spring(s) is in a pre-separation position (e.g., a compressed position).

In at least one embodiment, the method further involves separating the strongback of each of the spacecrafts from the two respective payload ports of the payload attach ring on the launch vehicle. In some embodiments, each of the beams comprises at least one mechanical actuator, and the separating of the strongback of each of the spacecrafts from each of the two respective payload ports is achieved by at least one mechanical actuator activating to allow for separation of the strongback of each of the spacecrafts from each of the two respective payload ports.

In one or more embodiments, each of the beams comprises at least one spring, and when the strongback of each of the spacecrafts is separated from each of the two respective payload ports, the spring(s) is extended to a post-separation position (e.g., a non-compressed position).

In at least one embodiment, a system for removably attaching at least one spacecraft to a payload attach ring on a launch vehicle involves the launch vehicle comprising the payload attach ring. The system further involves each of the spacecrafts comprising a strongback, where the strongback of each of the spacecrafts is configured to be attached to two respective payload ports of the payload attach ring on the launch vehicle.

In one or more embodiments, the strongback of each of the spacecrafts is configured to be attached to each of the two respective payload ports via a respective beam mounted to a respective port adaptor plate. In at least one embodiment, the strongback of each of the spacecrafts is configured to be attached to each of the beams via at least one coupler.

In at least one embodiment, each of the beams is configured to be mounted to each of the respective port adaptor plates via at least one bolt. In some embodiments, each of the port adaptor plates is configured to be mounted to one of the respective payload ports via at least one bolt.

In one or more embodiments, the strongback of each of the spacecrafts is configured to be separated from the two respective payload ports of the payload attach ring on the launch vehicle. In at least one embodiment, each of the beams comprises at least one mechanical actuator, and where the separating of the strongback of each of the spacecrafts from each of the two respective payload ports is achieved by at least one mechanical actuator activating to allow for separation of the strongback of each of the spacecrafts from each of the two respective payload ports.

In at least one embodiment, an apparatus for removably attaching at least one spacecraft to a payload attach ring on a launch vehicle involves a pair of beams. The apparatus further involves a pair of port adaptor plates. In one or more embodiments, a strongback of each of the spacecrafts is attached to two respective payload ports of the payload attach ring on the launch vehicle via a respective beam mounted to a respective port adaptor plate.

In at least one embodiment, the pair of beams are connected to each other via at least one crossbar to maintain relative alignment of the couplers.

The features, functions, and advantages can be achieved independently in various embodiments of the present disclosure or may be combined in yet other embodiments.

DRAWINGS

These and other features, aspects, and advantages of the present disclosure will become better understood with regard to the following description, appended claims, and accompanying drawings where:

DESCRIPTION

Figure 1:
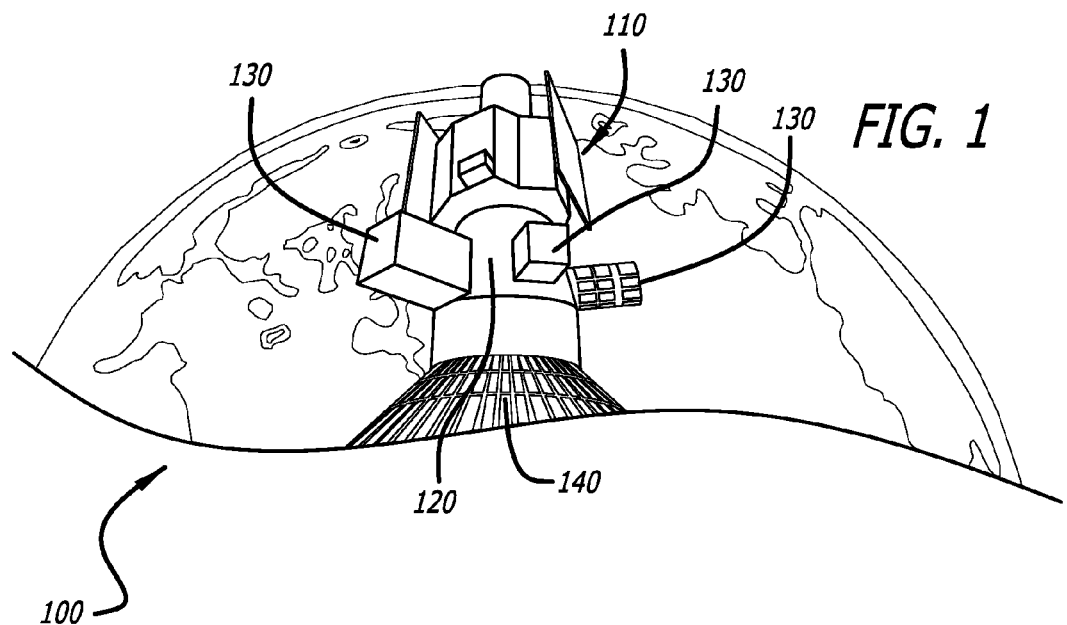
FIG. 1 is a diagram 100 depicting an exemplary launch vehicle with a payload attach ring that may be employed by the disclosed system for dual port payload attach ring compatible satellites, in accordance with at least one embodiment of the present disclosure.

The methods and apparatus disclosed herein provide an operative system for dual port payload attach ring compatible satellites. Specifically, this system provides a unique and novel approach to realize desired mission utility for relatively large satellites intended to be launched as ride-share payloads on payload attach rings.

For example, the single port capability on a standard service evolved expandable launch vehicle (EELV) secondary payload adaptor (ESPA) ring (manufactured by Moog CSA Engineering) limits the ride-share satellite size to be a constrained 181 kilograms (400 pounds) total weight and approximately 0.6096 meters (24 inches)×0.6096 meters (24 inches)×0.9144 meters (38 inches) in volume. These limitations can severely restrict the mission usefulness and life of ring-compatible satellites. The disclosed system employs two or more adjacent payload ports (e.g., ESPA ports) to split the load and increase the allowable volume of a ride-share spacecraft, thereby allowing for the launch of relatively large spacecraft while using a standard service ESPA ring.

As previously mentioned above, launch vehicles often employ a payload attach ring to attach multiple satellites to enable a shared launch for multiple satellites. Currently, conventional ring designs have a very limited ability to support relatively large satellites for launch. Larger payload attach ring designs have been proposed to support larger satellites. However, the allowable maximum height of the ring is dependent upon the size of the launch fairing of the launch vehicle. As such, taller payload attach rings may not be possible for all launches.

The system of the present disclosure addresses the limited mass and volume envelope available for payload attach ring-compatible satellites. The volume available to satellites on the ring is limited by the radial distance between the ring interface and the inner launch fairing wall. It is also limited by the volume taken by adjacent satellites on the ring. The mass of a satellite is limited by the single-port structural capability of the ring. This disclosed system allows for the satellite mass and volume to be distributed over two or more ring payload ports.

Other currently existing solutions either perform the mission using the payload attach ring structure itself or simply use a ring having a greater height. The disclosed system allows for other ride-share satellites to use the remaining payload attach ring payload ports. The system of the present disclosure is able to use the typical height ring, which allows for the most flexibility for launching with a variety of launch vehicles. However, it should be noted that the disclosed system may employ payload attach rings of various different heights.

In the following description, numerous details are set forth in order to provide a more thorough description of the system. It will be apparent, however, to one skilled in the art, that the disclosed system may be practiced without these specific details. In the other instances, well known features have not been described in detail so as not to unnecessarily obscure the system.

Embodiments of the present disclosure may be described herein in terms of functional and/or logical components and various processing steps. It should be appreciated that such components may be realized by any number of hardware, software, and/or firmware components configured to enable the specified functions. For example, an embodiment of the present disclosure may employ various integrated circuit components (e.g., memory elements, digital signal processing elements, logic elements, look-up tables, or the like), which may carry out a variety of functions under the control of one or more processors, microprocessors, or other control devices. In addition, those skilled in the art will appreciate that embodiments of the present disclosure may be practiced in conjunction with other components, and that the system described herein is merely one example embodiment of the present disclosure.

For the sake of brevity, conventional techniques and components related to payload attach ring-compatible satellites, and other functional aspects of the system (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

FIG. 1 is a diagram 100 depicting an exemplary launch vehicle 140 with a payload attach ring 120 that may be employed by the disclosed system for dual port payload attach ring compatible satellites, in accordance with at least one embodiment of the present disclosure. This figure shows a payload attach ring (e.g., an ESPA ring) 120 located beneath a primary payload 110. A standard ESPA ring 120 has six, fifteen (15) inch diameter payload ports (not shown) to which satellites 130 are attached.

Figure 2A:
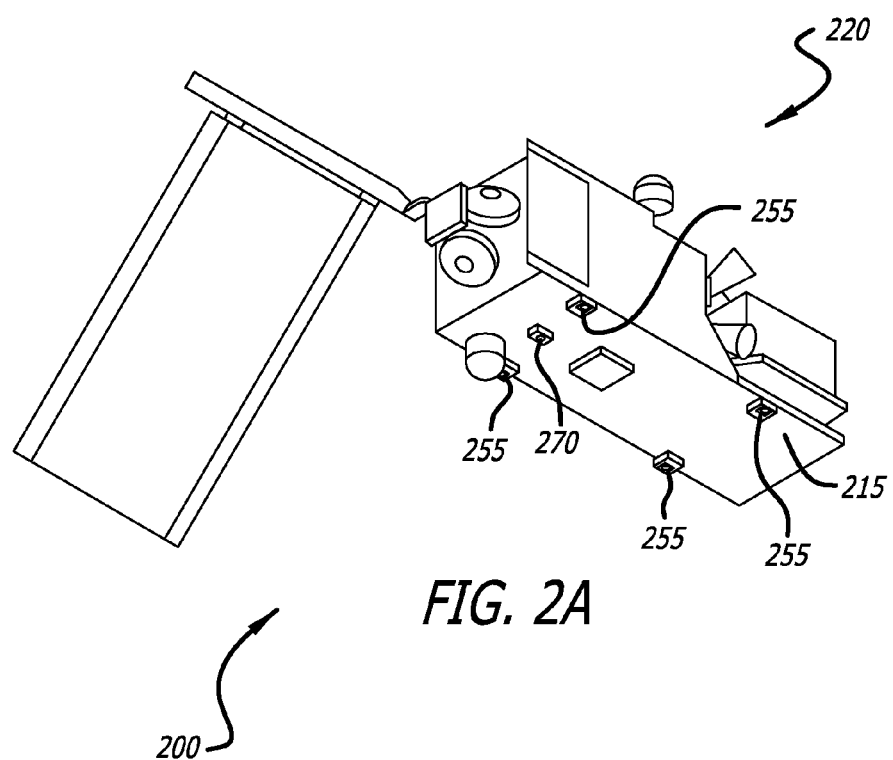
FIG. 2A is a diagram illustrating an exemplary spacecraft that may be employed by the disclosed system for dual port payload attach ring compatible satellites, in accordance with at least one embodiment of the present disclosure.

FIG. 2A is a diagram 200 illustrating an exemplary spacecraft 220 that may be employed by the disclosed system for dual port payload attach ring compatible satellites, in accordance with at least one embodiment of the present disclosure. In this figure, the spacecraft 220 is shown to include a strongback 215. The strongback 215 includes payload attach ring interfaces 255, which allow for the spacecraft 220 to be attached to a payload attach ring, and a mating umbilical connector 270. It should be noted that in some embodiments, various different types of spacecraft may be employed by the disclosed system other than the exemplary spacecraft 220 shown in this figure.

Figure 2B:
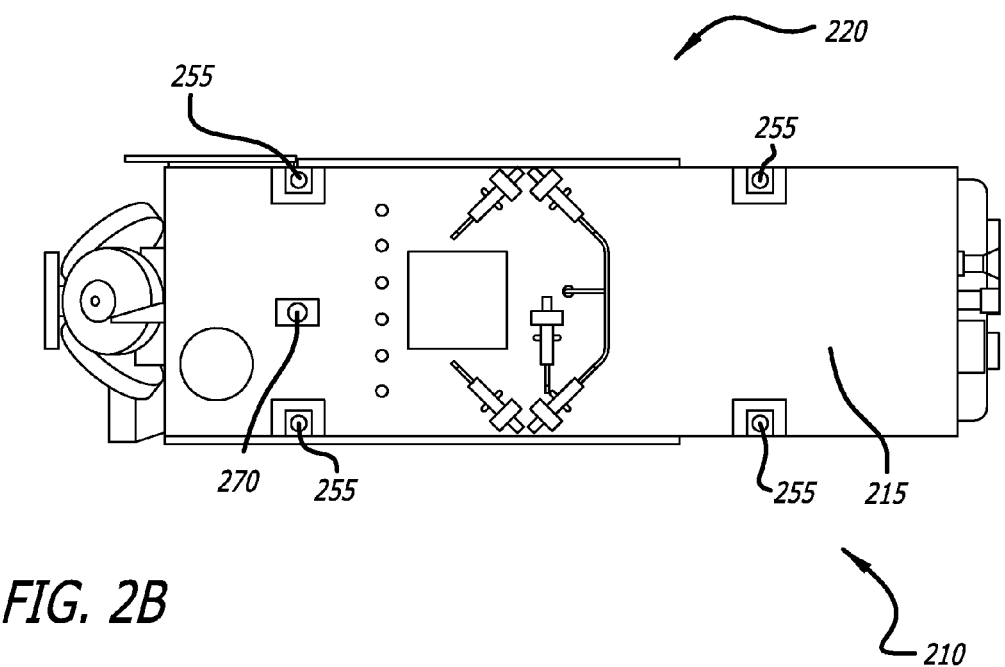
FIG. 2B is a diagram showing a different view of the exemplary spacecraft of FIG. 2A, in accordance with at least one embodiment of the present disclosure.

FIG. 2B is a diagram 210 showing a different view of the exemplary spacecraft 220 of FIG. 2A, in accordance with at least one embodiment of the present disclosure. In particular, this view shows the strongback 215 of the spacecraft 220. In this figure, the strongback 215 of the spacecraft 220 includes payload attach ring interfaces 255 and a mating umbilical connector 270.

Figure 3:
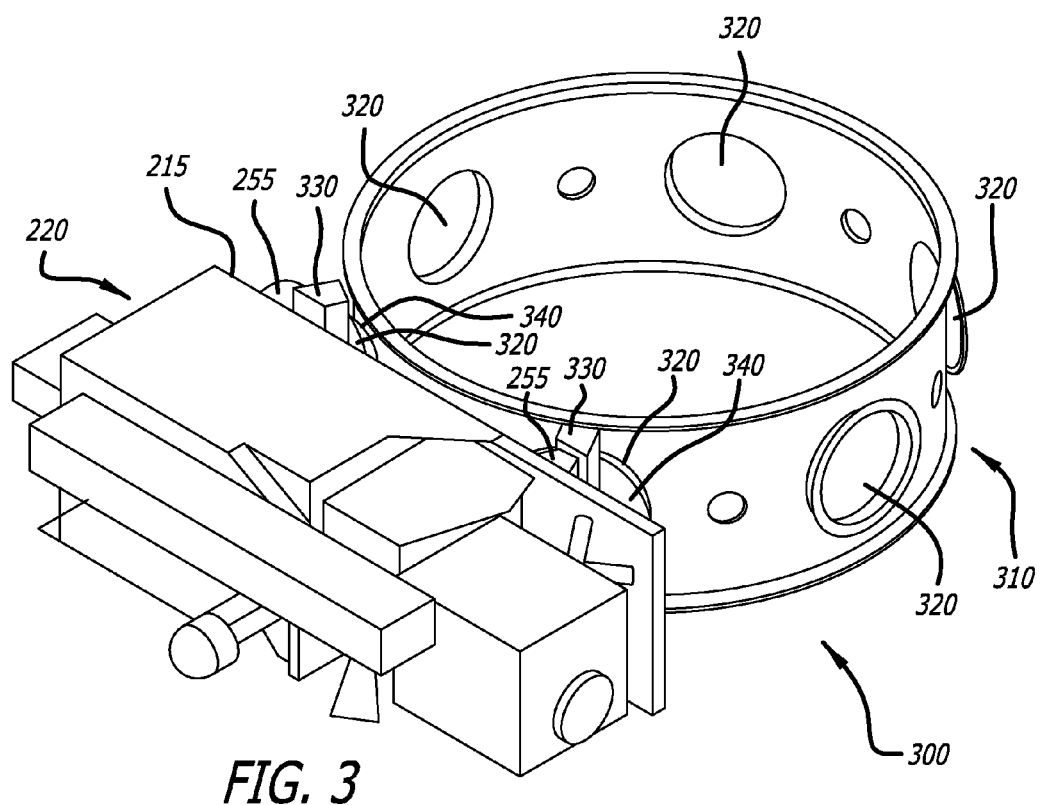
FIG. 3 is a diagram depicting the exemplary spacecraft of FIG. 2 attached to a payload attach ring, in accordance with at least one embodiment of the present disclosure.

FIG. 3 is a diagram 300 depicting the exemplary spacecraft 220 of FIG. 2 attached to a payload attach ring 310, in accordance with at least one embodiment of the present disclosure. In this figure, the payload attach ring 310 is shown to include six (6) payload ports 320. The payload attach ring interfaces 255 of the strongback 215 spacecraft 220 are shown to be mounted to two payload ports 320 of the payload attach ring 310 via beams 330 mounted to port adaptor plates 340.

Figure 4:
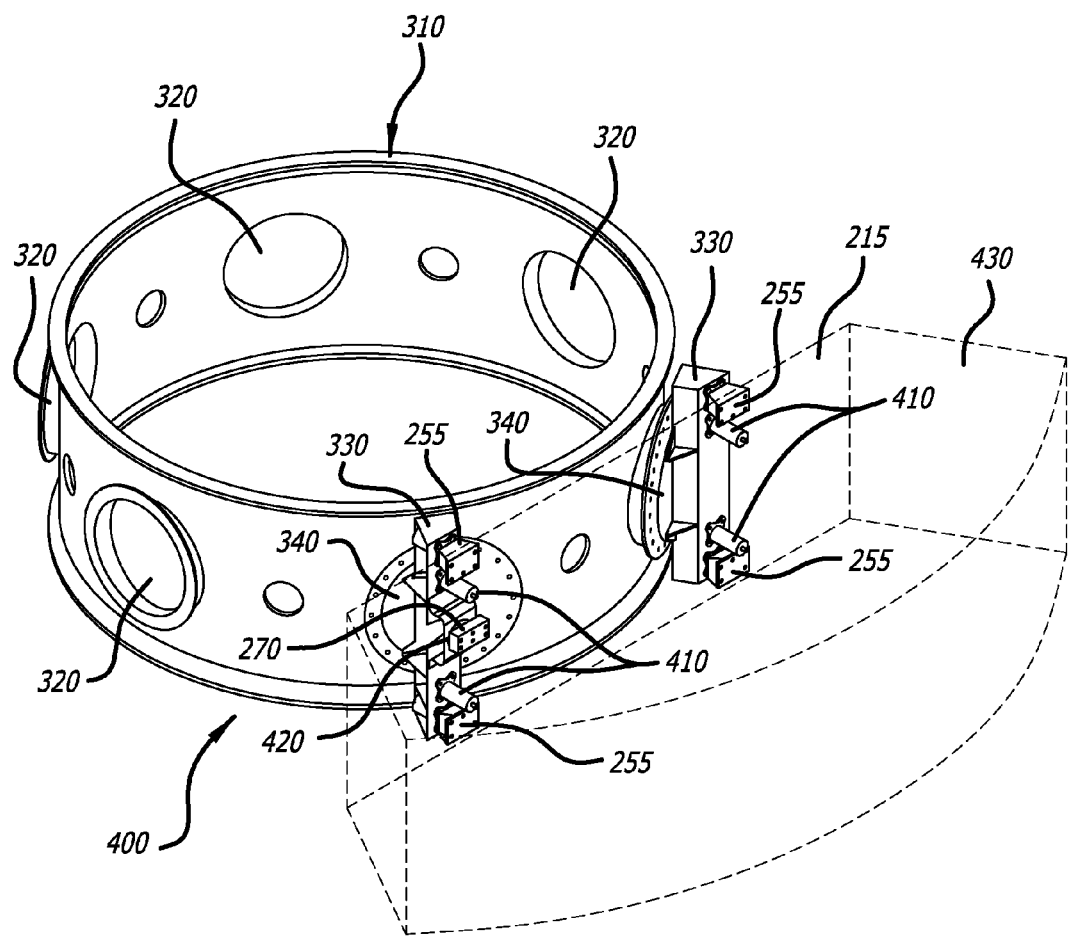
FIG. 4 is a diagram showing details of the disclosed system for dual port payload attach ring compatible satellites, in accordance with at least one embodiment of the present disclosure.

FIG. 4 is a diagram 400 showing details of the disclosed system for dual port payload attach ring compatible satellites, in accordance with at least one embodiment of the present disclosure. In this figure, payload attach ring interfaces 255 of a strongback 215 of a spacecraft (a spacecraft envelope is shown) 430 are shown to be mounted to two payload ports 320 of a payload attach ring 310 via beams 330 mounted to port adaptor plates 340. In this figure, the beams 330 are shown to each include two separation spring assemblies 410, which each contain a spring. Also, one of the beams 330 is shown to include an umbilical connector 420. A mating umbilical connector 270 is shown attached to the strongback 215. The umbilical connector 420 on the beam 330 and mating umbilical connector 270 on the strongback 215 are used for removably connecting electrical cables from the spacecraft 430 through the payload attach ring 310 and to the launch vehicle (not shown), which the payload attach ring is mounted.

Figure 5:
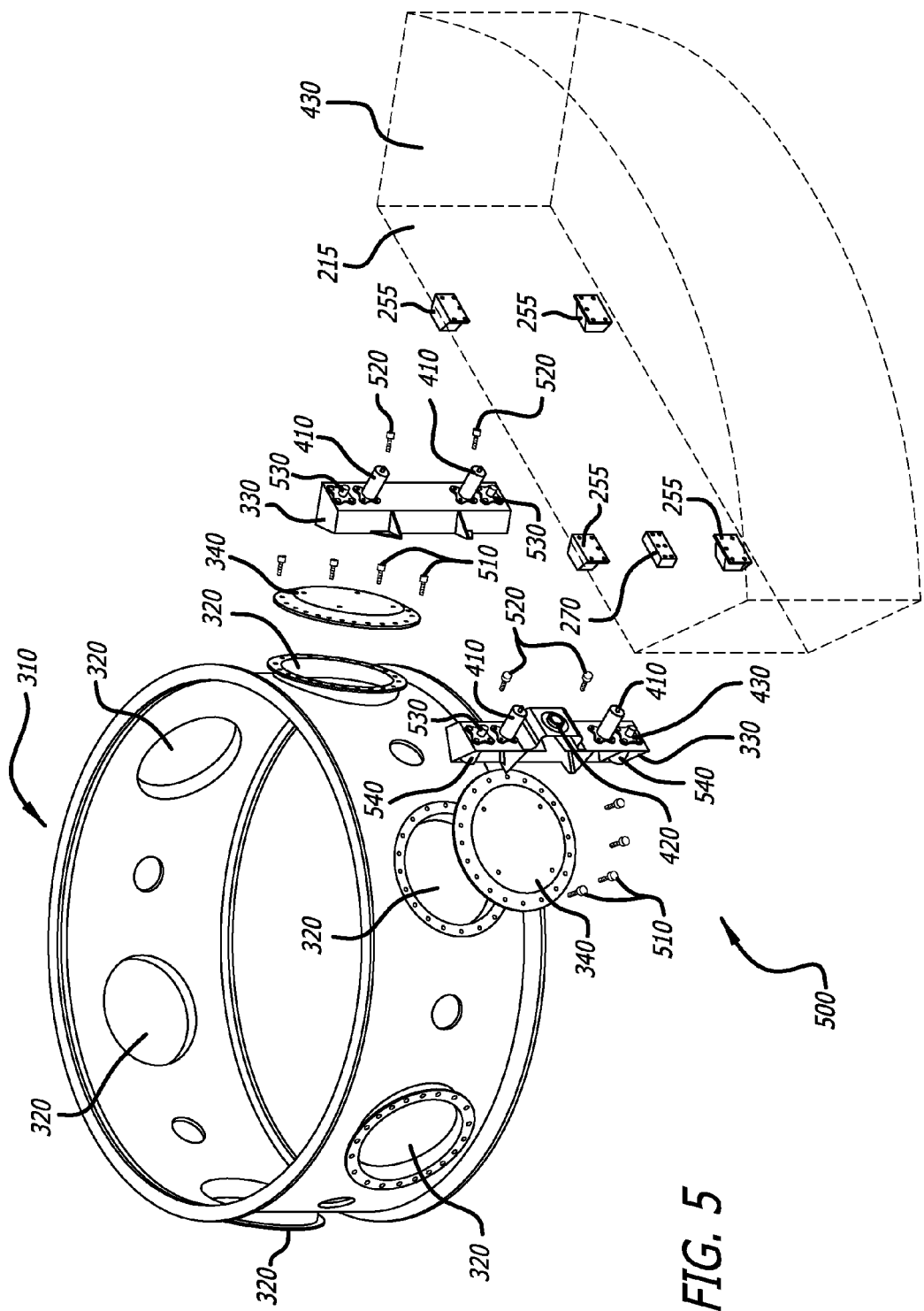
FIG. 5 is a diagram showing an exploded detailed view of the disclosed system for dual port payload attach ring compatible satellites, in accordance with at least one embodiment of the present disclosure.

FIG. 5 is a diagram showing an exploded detailed view of the disclosed system for dual port payload attach ring compatible satellites, in accordance with at least one embodiment of the present disclosure. In this figure, two port adaptor plates 340 are to be mounted to two payload ports 320, respectively, of a payload attach ring 310 via bolts 510. Also, a beam 330 is to be mounted to each port adaptor plate 340 via bolts 520. Each payload attach ring interface 255 of a strongback 215 of a spacecraft (a spacecraft envelope is shown) 430 is to be attached to a coupler 530 on the beams 330. In one or more embodiments, the couplers 530 are cup/cone interfaces. It should be noted that in some embodiments, other types of interfaces (such as other similar load bearing interfaces) other than cup/cone interfaces may be used for the couplers 530 of the beams 330. Behind each coupler 530, and within the beam 330, is a mechanical actuator 540 to provide the tension for holding each of the respective couplers 530 together.

Figure 6A:
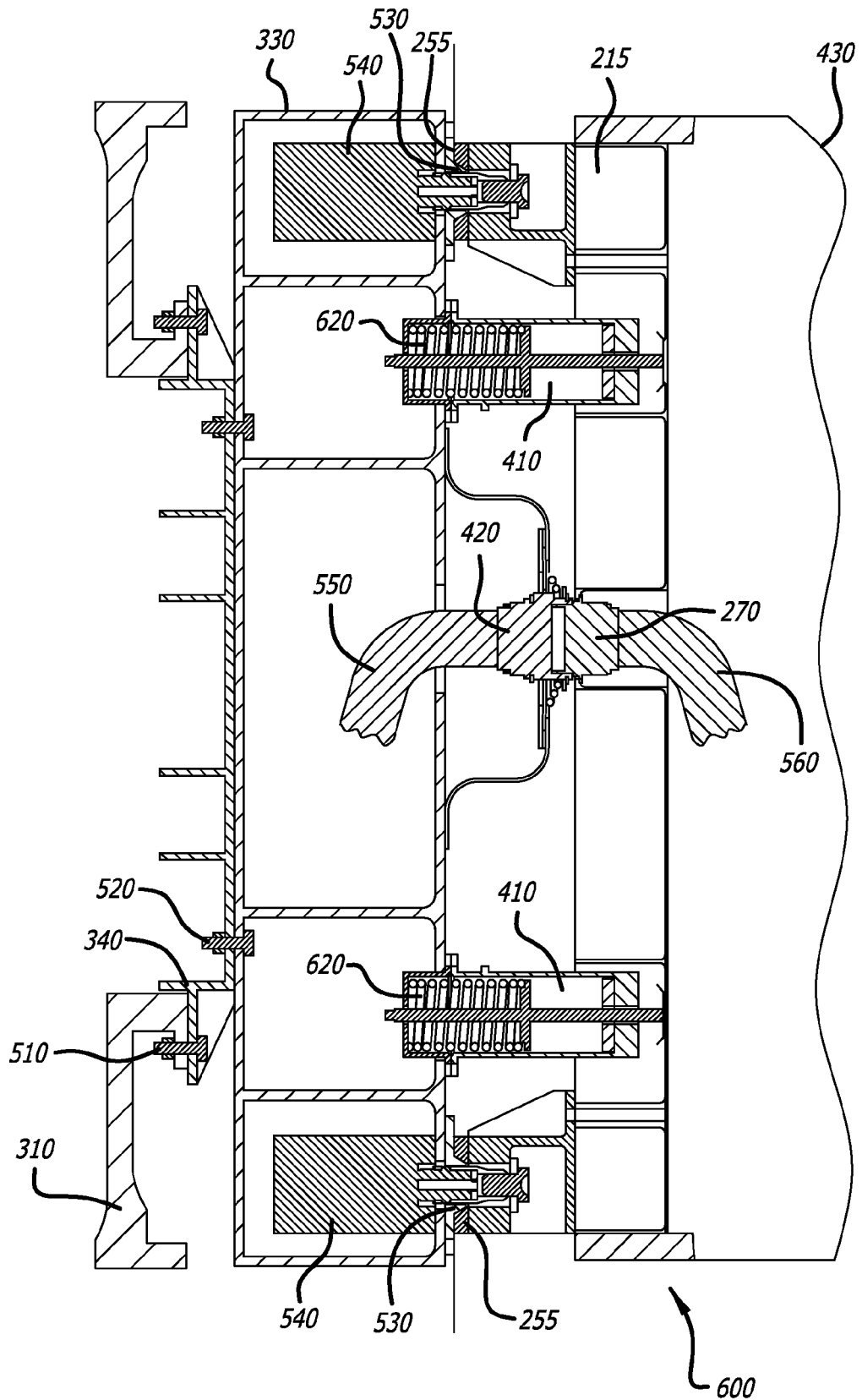
FIG. 6A is a diagram showing a cut-away side view of the disclosed system for dual port payload attach ring compatible satellites, where a strongback of a satellite is attached to a beam, in accordance with at least one embodiment of the present disclosure.

FIG. 6A is a diagram 600 showing a cut-away side view of the disclosed system for dual port payload attach ring compatible satellites, where a strongback 215 of a spacecraft 430 is attached to a beam 330, in accordance with at least one embodiment of the present disclosure. In this figure, a strongback 215 of a satellite (not shown) is shown to be attached to a payload attach ring 310 via a beam 330 mounted to a port adaptor plate 340. During operation, for the attachment, each payload attach ring interface 255 of a strongback 215 of a spacecraft 430 is attached to a coupler 530 on the beam 330. In addition, when the strongback 215 is attached to a beam 330, as is shown in this figure, the umbilical connector 420 of the beam 330 mates with the mating umbilical connector 270 of the strongback 215 to allow for electrical cables to be removably connected from the strongback 215 of the spacecraft 430 through the payload attach ring 310 and to the launch vehicle (not shown), which the payload attach ring 310 is mounted. Additionally, when the strongback 215 is attached to a beam 330, as is shown in this figure, a spring 620 within each separation spring assembly 410 of the beam 330 is in a pre-separation position (e.g., a compressed position). Also shown in this figure is a harness 550, 560 attached to the umbilical connector 420 and the mating umbilical connector 270, respectively. As separation occurs, the umbilical connector 420 of the beam 330 separates from the mating umbilical connector 270 of the strongback 215 allowing the spacecraft 430 to be electrically disconnected from the launch vehicle (not shown).

Figure 6B:
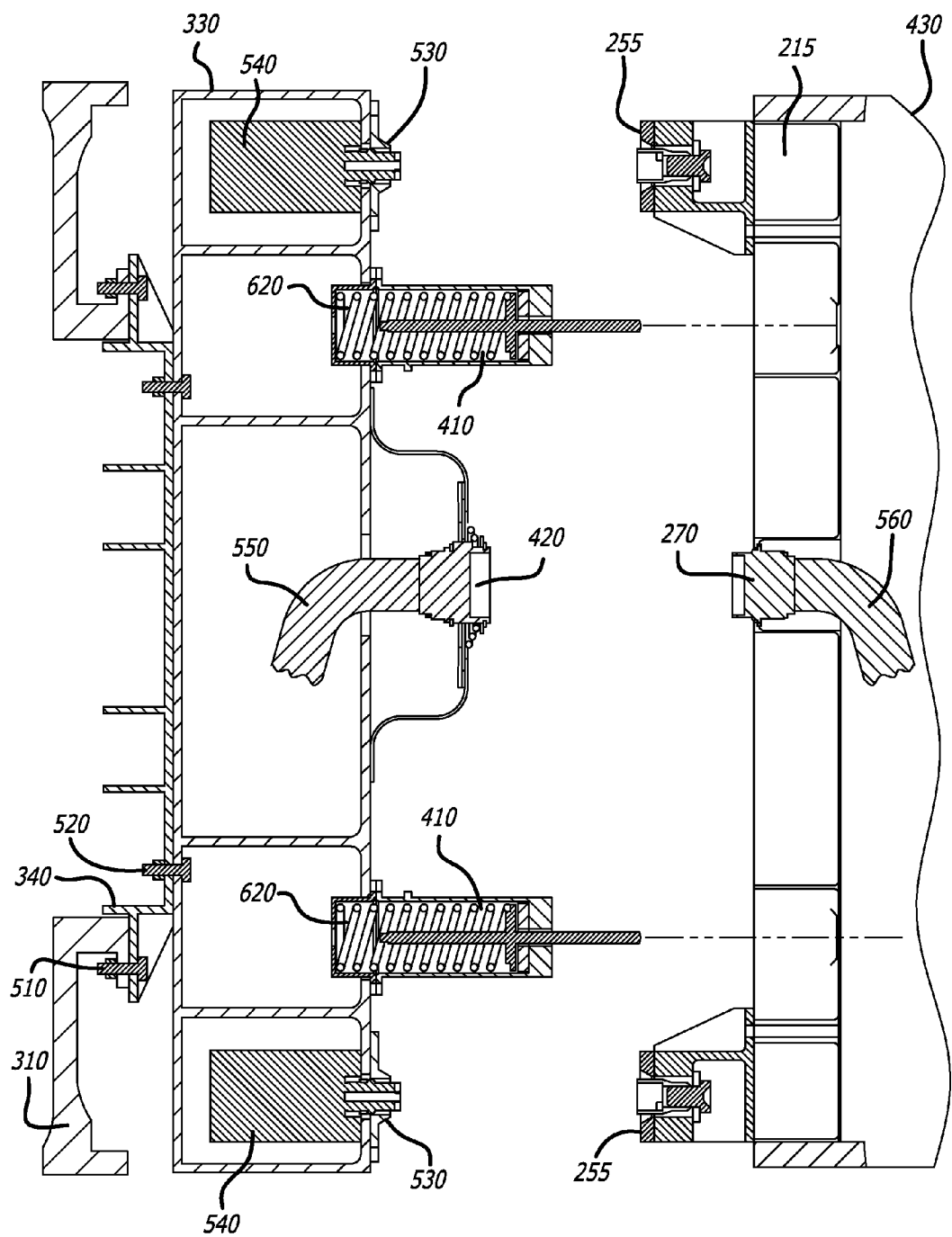
FIG. 6B is a diagram showing a cut-away side view of the disclosed system for dual port payload attach ring compatible satellites, where a strongback of a satellite is separated from a beam, in accordance with at least one embodiment of the present disclosure.

FIG. 6B is a diagram 610 showing a cut-away side view of the disclosed system for dual port payload attach ring compatible satellites, where a strongback 215 of a satellite is separated from a beam 330, in accordance with at least one embodiment of the present disclosure. In this figure, a strongback 215 of a satellite (not shown) is separated from a payload attach ring 310 via a beam 330 mounted to a port adaptor plate 340. During operation, for the separation, mechanical actuators 540, which are located behind each coupler 530 and within the beam 330, activate, thereby breaking the coupler 530 interface to the payload attach ring interface 255 of the strongback 215. After the mechanical actuators 540 release, the coupler 530 separates, the springs 620 within each separation spring assembly 410 of the beam 330 are extended in a post-separation position (e.g., a non-compressed position), thereby providing force against the strongback 215 for the separation.

Figure 7:
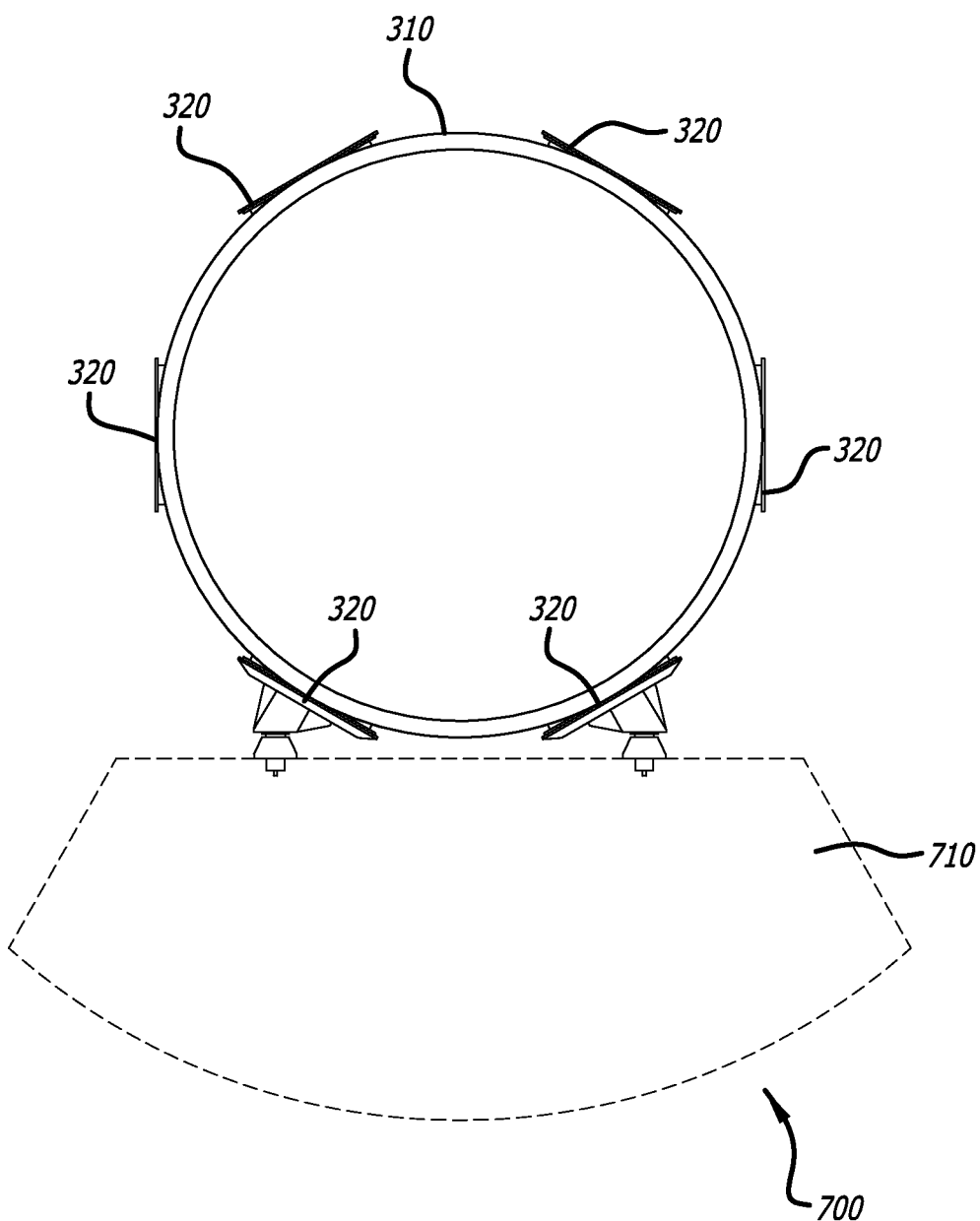
FIG. 7 is a diagram illustrating the disclosed system for dual port payload attach ring compatible satellites, where one relatively large satellite is attached to a ring, in accordance with at least one embodiment of the present disclosure.

FIG. 7 is a diagram 700 illustrating the disclosed system for dual port payload attach ring compatible satellites, where one relatively large satellite 710 is attached to a payload attach ring 310, in accordance with at least one embodiment of the present disclosure. In this figure, a single relatively large satellite (a satellite envelope is shown) 710 is shown to be attached to two payload ports 320 of a payload attach ring 310.

Figure 8:
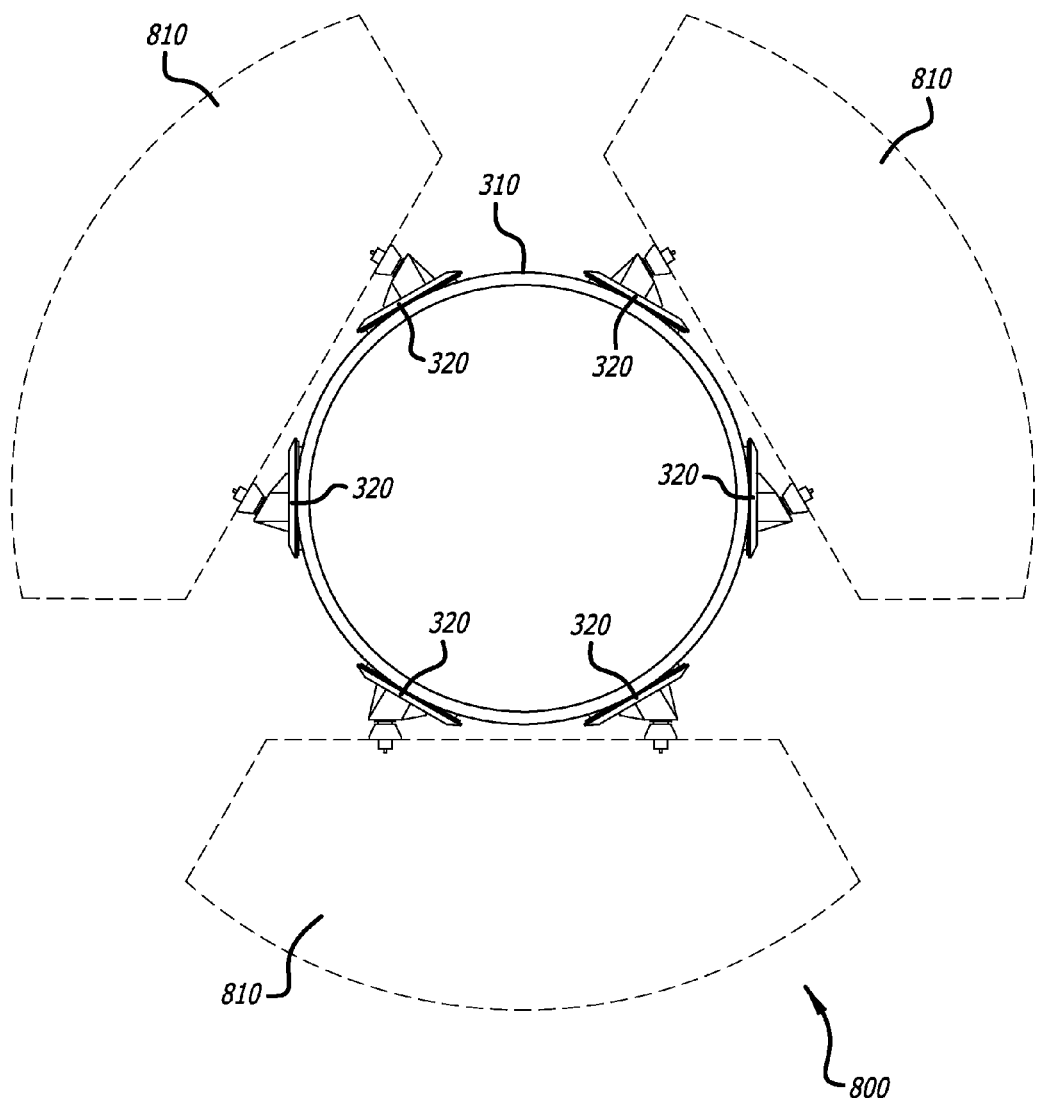
FIG. 8 is a diagram showing the disclosed system for dual port payload attach ring compatible satellites, where three relatively large satellites are attached to a ring, in accordance with at least one embodiment of the present disclosure.

FIG. 8 is a diagram 800 showing the disclosed system for dual port payload attach ring compatible satellites, where three relatively large satellites 810 are attached to a ring 310, in accordance with at least one embodiment of the present disclosure. In this figure, three relatively large satellites (satellite envelopes are shown) 810 are each shown to be attached to two payload ports 320 of a payload attach ring 310.

Figure 9:
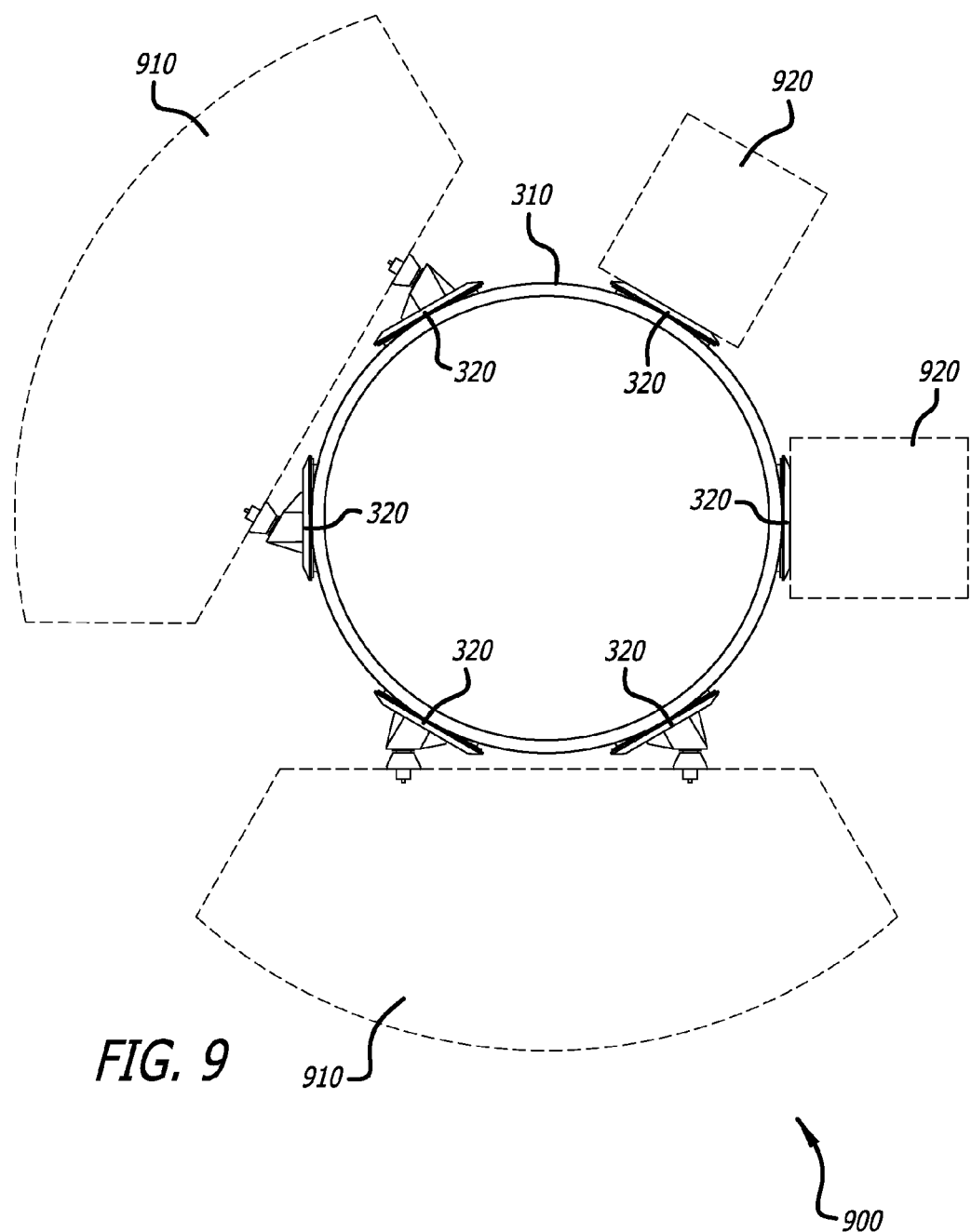
FIG. 9 is a diagram showing the disclosed system for dual port payload attach ring compatible satellites, where two relatively large satellites and two small satellites are attached to a payload attach ring, in accordance with at least one embodiment of the present disclosure.

FIG. 9 is a diagram 900 showing the disclosed system for dual port payload attach ring compatible satellites, where two relatively large satellites 910 and two small satellites 920 are attached to a payload attach ring 310, in accordance with at least one embodiment of the present disclosure. In this figure, two relatively large satellites (satellite envelopes are shown) 910 are each shown to be attached to two payload ports 320 of a payload attach ring 310. In addition, two small satellites (satellite envelopes are shown) 920 are each shown to be attached to one payload port 320 of a payload attach ring 310.

Figure 10:
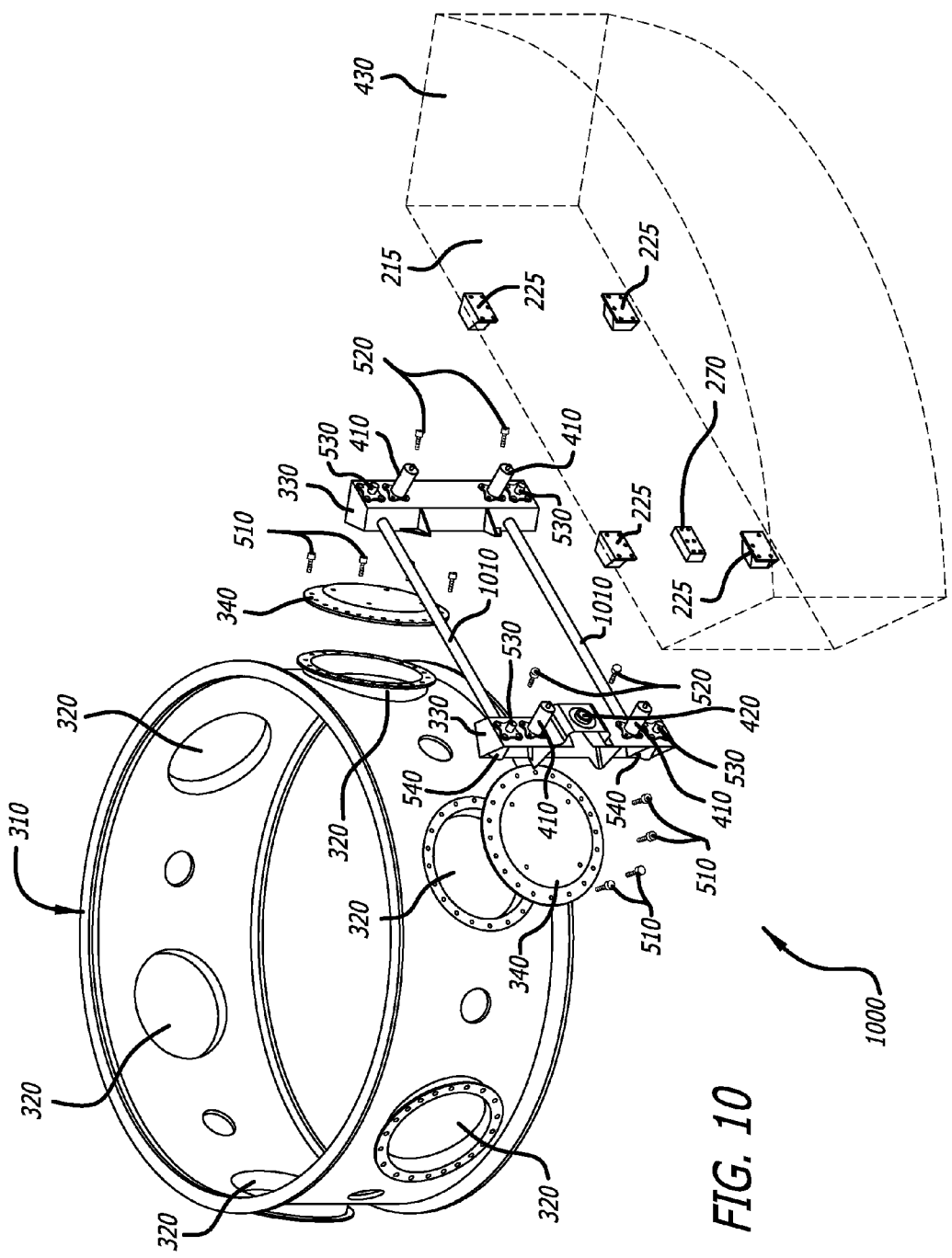
FIG. 10 is a diagram showing an exploded detailed view of the disclosed system for dual port payload attach ring compatible satellites, where the beams are connected to each other by crossbars, in accordance with at least one embodiment of the present disclosure.

FIG. 10 is a diagram 1000 showing an exploded detailed view of the disclosed system for dual port payload attach ring compatible satellites, where the beams 330 are connected to each other by crossbars 1010, in accordance with at least one embodiment of the present disclosure. In this figure, two beams 330 are shown to be connected to one another via a pair of crossbars 1010 to add strength and stability, and to maintain relative alignment of the couplers 530. It should be noted that in some embodiments, one or more than two crossbars 1010 may be employed instead of utilizing two crossbars 1010 as is shown in this figure.

Figure 11:
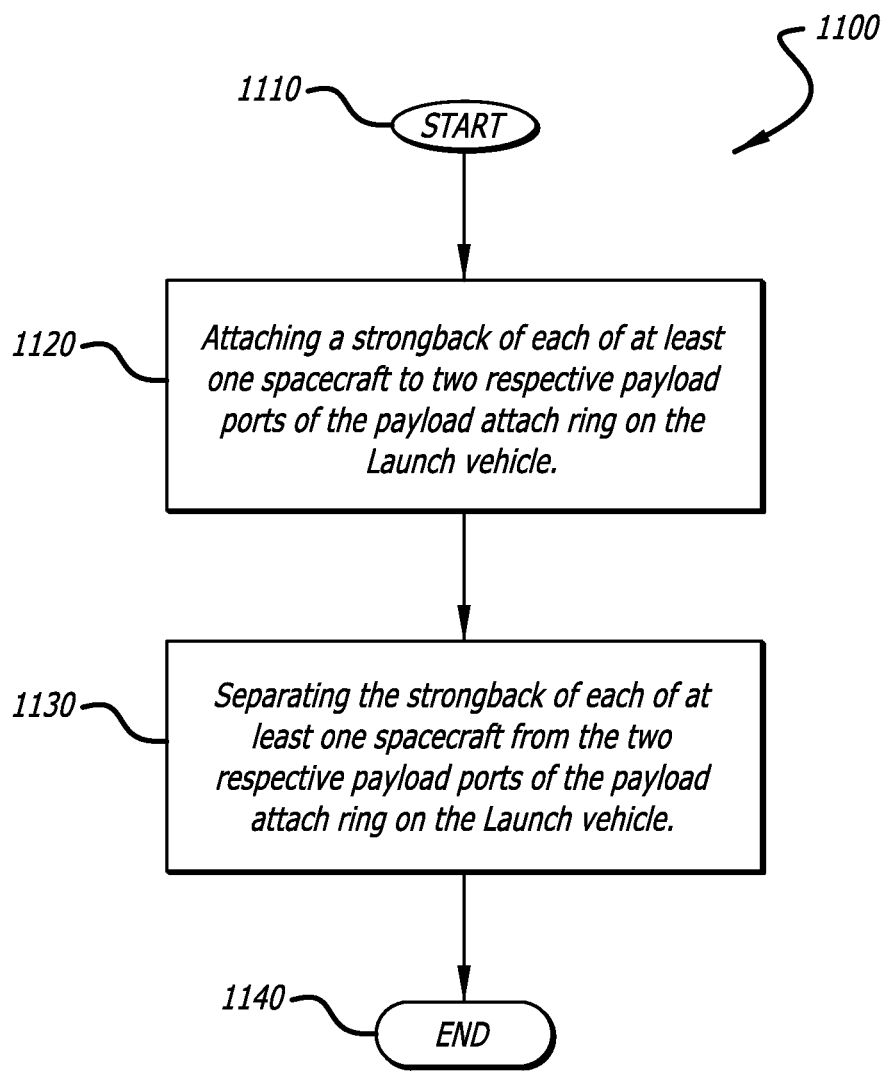
FIG. 11 is a flow chart showing the disclosed method for dual port payload attach ring compatible satellites, in accordance with at least one embodiment of the present disclosure.

FIG. 11 is a flow chart showing the disclosed method 1100 for dual port payload attach ring compatible satellites, in accordance with at least one embodiment of the present disclosure. At the start 1110 of the method 1100, a strongback of each of at least one spacecraft is attached to two respective payload ports of a payload attach ring (e.g., an ESPA ring) on a launch vehicle 1120. Then, the strongback of each of the spacecrafts is separated from the two respective payload ports of the payload attach ring on the launch vehicle 1130. Then, the method 1100 ends 1140.

Although particular embodiments have been shown and described, it should be understood that the above discussion is not intended to limit the scope of these embodiments. While embodiments and variations of the many aspects of the present disclosure have been disclosed and described herein, such disclosure is provided for purposes of explanation and illustration only. Thus, various changes and modifications may be made without departing from the scope of the claims. Accordingly, embodiments are intended to exemplify alternatives, modifications, and equivalents that may fall within the scope of the claims.

Where methods described above indicate certain events occurring in certain order, those of ordinary skill in the art having the benefit of this disclosure would recognize that the ordering may be modified and that such modifications are in accordance with the variations of the present disclosure. Additionally, parts of methods may be performed concurrently in a parallel process when possible, as well as performed sequentially. In addition, more parts or less part of the methods may be performed.

We claim:

1. A method for removably attaching at least one spacecraft to a payload attach ring on a launch vehicle, the method comprising:
    attaching a strongback of each of the at least one spacecraft to two respective payload ports of the payload attach ring on the launch vehicle,
    wherein the strongback of each of the at least one spacecraft is attached to each of the two respective payload ports via a respective beam mounted to a respective port adaptor plate, and
    wherein each of the beams is mounted to each of the respective port adaptor plates via at least one bolt.

2. The method of claim 1, wherein the strongback of each of the at least one spacecraft is attached to each of the beams via at least one coupler.

3. The method of claim 2, wherein the at least one coupler is one of a cup/cone interface or a load bearing interface.

4. The method of claim 1, wherein each of the port adaptor plates is mounted to one of the respective payload ports via at least one bolt.

5. The method of claim 1 wherein each of the beams comprises at least one spring, and wherein when the strongback of each of the at least one spacecraft is attached to each of the two respective payload ports, the at least one spring is in a pre-separation position.

6. The method of claim 1, wherein the method further comprises separating the strongback of each of the at least one spacecraft from the two respective payload ports of the payload attach ring on the launch vehicle.

7. The method of claim 6, wherein each of the beams comprises at least one mechanical actuator, and wherein the separating of the strongback of each of the at least one spacecraft from each of the two respective payload ports is achieved by the at least one mechanical actuator activating to allow for separation of the strongback of each of the at least one spacecraft from each of the two respective payload ports.

8. The method of claim 6, wherein each of the beams comprises at least one spring, and wherein when the strongback of each of the at least one spacecraft is separated from each of the two respective payload ports, the at least one spring is extended to a post-separation position.

9. A system for removably attaching at least one spacecraft to a payload attach ring on a launch vehicle, the system comprising:
    the launch vehicle comprising the payload attach ring; and
    each of the at least one spacecraft comprising a strongback, wherein the strongback of each of the at least one spacecraft is configured to be attached to two respective payload ports of the payload attach ring on the launch vehicle,
    wherein the strongback of each of the at least one spacecraft is configured to be attached to each of the two respective payload ports via a respective beam mounted to a respective port adaptor plate, and
    wherein each of the beams is configured to be mounted to each of the respective port adaptor plates via at least one bolt.

10. The system of claim 9, wherein the strongback of each of the at least one spacecraft is configured to be attached to each of the beams via at least one coupler.

11. The system of claim 10, wherein the at least one coupler is one of a cup/cone interface or a load bearing interface.

12. The system of claim 9, wherein each of the port adaptor plates is configured to be mounted to one of the respective payload ports via at least one bolt.

13. The system of claim 9, wherein each of the beams comprises at least one spring, and wherein when the strongback of each of the at least one spacecraft is attached to each of the two respective payload ports, the at least one spring is in a pre-separation position.

14. The system of claim 9, wherein the strongback of each of the at least one spacecraft is configured to be separated from the two respective payload ports of the payload attach ring on the launch vehicle.

15. The system of claim 14, wherein each of the beams comprises at least one mechanical actuator, and wherein the separating of the strongback of each of the at least one spacecraft from each of the two respective payload ports is achieved by the at least one mechanical actuator activating to allow for separation of the strongback of each of the at least one spacecraft from each of the two respective payload ports.

16. The system of claim 14, wherein each of the beams comprises at least one spring, and wherein when the strongback of each of the at least one spacecraft is separated from each of the two respective payload ports, the at least one spring is extended to a post-separation position.

17. An apparatus for removably attaching at least one spacecraft to a payload attach ring on a launch vehicle, the apparatus comprising:
   a pair of beams; and
   a pair of port adaptor plates,
   wherein a strongback of each of the at least one spacecraft is attached to two respective payload ports of the payload attach ring on the launch vehicle via a respective beam of the pair of beams mounted to a respective port adaptor plate of the pair of port adaptor plates, and
   wherein each beam of the pair of beams is mounted to each of the respective port adaptor plates via at least one bolt.

18. The apparatus of claim 17, wherein the pair of beams are connected to each other via at least one crossbar.

* * * * *